United States Patent
Dybedokken et al.

(10) Patent No.: US 6,760,411 B2
(45) Date of Patent: Jul. 6, 2004

(54) METHOD FOR PASSING INFORMATION BETWEEN A LOCAL EXCHANGE AND A USER/TERMINAL

(75) Inventors: Bjørn Magne Dybedokken, Bærums Verg (NO); Sverre Tønnesland, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 204 days.

(21) Appl. No.: 09/870,947

(22) Filed: Jun. 1, 2001

(65) Prior Publication Data

US 2002/0015479 A1 Feb. 7, 2002

Related U.S. Application Data

(63) Continuation of application No. PCT/NO99/00368, filed on Dec. 7, 1999.

(30) Foreign Application Priority Data

Dec. 8, 1998 (NO) ................................................ 985747

(51) Int. Cl.[7] .............................................. H04M 1/64
(52) U.S. Cl. ................................ 379/88.06; 379/88.05; 455/66
(58) Field of Search ........................... 379/88.05, 88.06, 379/127.05, 219, 263, 67.1, 88.01; 370/352; 455/66; 704/3; 705/6

(56) References Cited

U.S. PATENT DOCUMENTS

| | | | |
|---|---|---|---|
| 5,440,615 A | | 8/1995 | Caccuro et al. |
| 5,524,137 A | | 6/1996 | Rhee |
| 5,675,817 A | | 10/1997 | Moughanni et al. |
| 5,703,935 A | * | 12/1997 | Raissyan et al. ........ 379/127.05 |
| 5,732,326 A | * | 3/1998 | Maruyama et al. ........... 455/66 |
| 5,751,792 A | * | 5/1998 | Chau et al. ................. 370/352 |
| 5,875,422 A | * | 2/1999 | Eslambolchi et al. .... 379/88.06 |
| 6,111,937 A | * | 8/2000 | Kuroiwa et al. ............ 379/263 |
| 6,161,082 A | * | 12/2000 | Goldberg et al. ............... 704/3 |
| 6,175,622 B1 | * | 1/2001 | Chiniwala et al. .......... 379/219 |
| 6,240,170 B1 | * | 5/2001 | Shaffer et al. ........... 379/88.06 |
| 6,313,735 B1 | * | 11/2001 | Higuchi .................... 379/88.05 |
| 6,356,874 B1 | * | 3/2002 | .O slashed.hrn ............... 705/6 |
| 6,393,403 B1 | * | 5/2002 | Majaniemi ............... 379/88.01 |

FOREIGN PATENT DOCUMENTS

| | | |
|---|---|---|
| EP | 0 654 930 A | 5/1995 |
| EP | 0 742 676 A2 | 11/1996 |
| WO | 97/24862 A | 7/1997 |
| WO | 98/27759 | 6/1998 |
| WO | 98/47274 A | 10/1998 |

* cited by examiner

*Primary Examiner*—Fan Tsang
*Assistant Examiner*—Gerald Gauthier
(74) *Attorney, Agent, or Firm*—Nixon & Vanderhye P.C.

(57) ABSTRACT

The present invention relates to a method for passing information between a local exchange and a user/terminal, the language used for presenting the information being chosen in the terminal and the local exchange, and in order to avoid that messages generated by the terminal and the text generated by the local exchange are presented in different languages the present invention suggest a method to synchronize the language in the terminal and the language of the local exchange, or vice versa, wherein are used predefined codes for each of the languages involved.

16 Claims, 2 Drawing Sheets

METHOD FOR PASSING INFORMATION BETWEEN A LOCAL EXCHANGE AND A USER/TERMINAL

This a continuation of PCT/N099/00368 filed Dec. 7, 1999.

FIELD OF THE INVENTION

The present invention relates to a method for passing information between a local exchange and a user/terminal of the type as stated in the preamble of the enclosed patent claim 1.

The present invention is primarily related to cordless (DECT) telecommunication networks, but may also be applicable for other cellular and fixed networks.

PRIOR ART

The Problem Area

Many modern telephone exchanges and terminals have the possibility to pass information to the users in the form of text messages. The displayed information is either generated locally in the terminal, e.g. to inform the user of an incoming call, menu options etc., or generated by the local exchange e.g. to inform the user of available services, message waiting etc.

The language used for presenting the information may be chosen in the terminal and in the local exchange. If different languages are chosen in the terminal and the local exchange, there will be a mismatch in the displayed messages. There is no solution that synchronises the language to be generated locally in the terminal and the language that the local exchange uses.

Known Solutions

One can choose the language for displaying locally generated messages in many modern terminals. One can also choose the language for displaying text generated by most modern telephone exchanges.

There does not, however, exist any system which synchronizes the language in the terminal with the language of the local exchange, or vice versa.

Problems with Known Solutions

The problem with existing solutions is that messages generated by the terminal and the text generated by the local exchange may differ. Typically, the individual user can select the language of messages generated by the terminal, but not the messages generated by the local exchange. In a multilingual environment, it may be difficult to pass on information that all users understand.

FURTHER PRIOR ART

There are also previously known systems comprising complex messaging and recorded voice messaging with translation capabilities.

However, in some of these prior art systems it seems unlikely that the language code can be changeable at all. U.S. Pat. No. 5,524,137 (Rhee) relates to a multimedia messaging system, which system is acting more as a language translator. Consequently, this prior art teaching is silent about how to synchronize a local network and the terminal connected thereto, to use the same language. Further, the prior system is also silent about having such a same language supported initially, and have the various messages stored in their database, so that no translation mechanism needs to be involved.

WO 98/27759 (Nokia/Palovita) relates to a method of forwarding voice messages to a subscriber, in which case the language indication for the specific user is permanently stored as part of the user data. This prior art technique is broadly used in any system with language support, but is not relevant in connection with the present invention.

EP 0 742 676 A2 (Siemens/Dzuban) relates to a method for transferring messages from one user to another, wherein is used a form of permanent code for the language that one of the user supports, which code is distributed in the system based on the mobile user location.

Consequently, there is no indication in this prior art teaching about any change of code.

U.S. Pat. No. 5,440,615 (Caccuro et al.) relates to language selection for voice messaging system, comprising an intelligent recorded voice announcement system that is based on the incoming information from the called party answer in the appropriate language. However, this publication is silent about various text exchange between different systems, such as status information, call progress messages, short message services, or similar.

U.S. Pat. No. 5,675,817 (Moughanni et al.) relates to language translating pager and method therefore, wherein translation capabilities are included. However, neither does this publication give any instructions for synchronizing the language used in the end user terminal and the local network, in order to keep the consistency in these two units.

WO 97/24862 relates to a method for providing language support for a user in a telecommunication network. Language preferences is stored in a database which will decide the language used by exchanges and telephone services when transmitting messages to the telephone user. The telephone user can change the preferences stored in a database with telephone commands from a telephone. Neither this publication give any instructions for synchronising the language used in the user terminal and the local network, in order to keep the consistency in these two units.

OBJECTS OF THE INVENTION

The main object of the present invention is to provide a method for automatically setting the same language on the terminal as in a local exchange.

Another object of the present invention is to provide a method whereby this automatic setting is effected in a simple, reliable and expedient manner.

Still another object of the present invention is to provide a method whereby all messages are presented in one language, and whereby the language can be chosen for each user/terminal.

A further object of the present invention is to provide a method for synchronizing the language used in the end user terminal and the local network, for thereby keeping the consistency there between.

Yet another object of the present invention is to provide a method which is specifically related to various text exchanges between different systems, such as status information, call progress messages, short message services, or similar.

A still further object of the invention is to provide predefined codes which can be changed in a rapid and easy manner.

SUMMARY OF THE INVENTION

These objects are achieved in a method as stated in the preamble, which according to the present invention is characterized by the features as stated in the characterizing clause of the enclosed patent claim 1. In other words, the solution according to the present invention is to the fact to automatically setting the language on the terminal as in local exchange.

This can be accomplished in different ways. The main issue is, however, that all messages are presented in one language, and that language can be chosen for each user/terminal in question.

More specifically, in order to synchronize the language in the terminal and the language of the local exchange, or vice versa, the present invention is implemented by using predefined codes for each of the languages involved.

Further features and advantages of the present method will appear from the following description taken in conjunction with the enclosed drawings, as well as from the further enclosed patent claims.

BRIEF DISCLOSURE OF THE DRAWINGS

DETAILED DESCRIPTION OF EMBODIMENTS

In the following there will be given a few examples of how the synchronisation of language can be implemented according to the present invention. Common to all described solutions is that the terminal and the local exchange use predefined codes for each of the languages.

Figure 1:
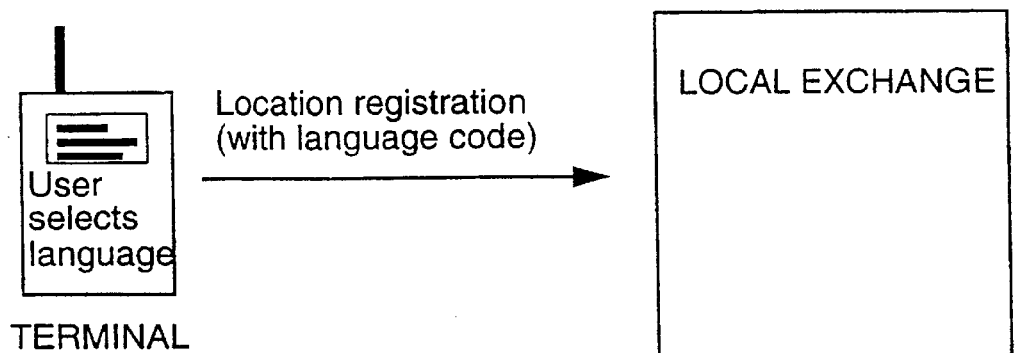
FIG. 1 is a schematical drawing illustrating a first embodiment of the present invention, wherein the language is set in a terminal, and the local exchange is informed in a roaming procedure.

In FIG. 1 there is illustrated a terminal communicating with a local exchange, and in this specific embodiment the language is set in the terminal, whereas the local exchange is informed in a roaming procedure.

The user uses the built-in option to select the language to be used in the terminal. When the user performs a roaming procedure, the language code is sent to the local exchange. This embodiment is only applicable to wireless terminals.

Figure 2:
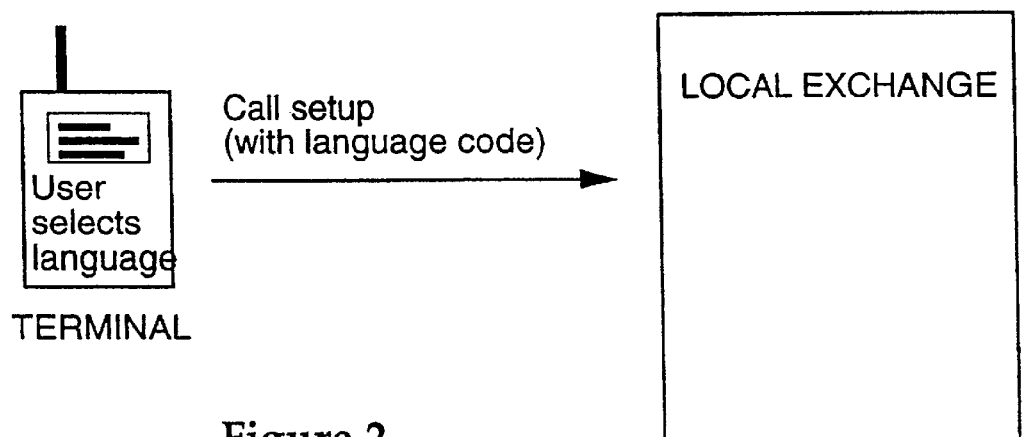
FIG. 2 is a schematic drawing illustrating a second embodiment of the present invention, wherein the language is set in the terminal, and the local exchange is informed at call establishment.

In FIG. 2 there is also illustrated a terminal communicating with a local exchange, and in this embodiment the language is also set in the terminal, whereas the local exchange is informed thereabout at call establishment.

This solution is basically the same as explained in connection with FIG. 1, but the local exchange is here informed at the establishment of a call.

This call could be a "normal call", or it could be a call set up to inform the local exchange of the desired language. This solution is applicable to both wireless and wired terminals.

Figure 3:
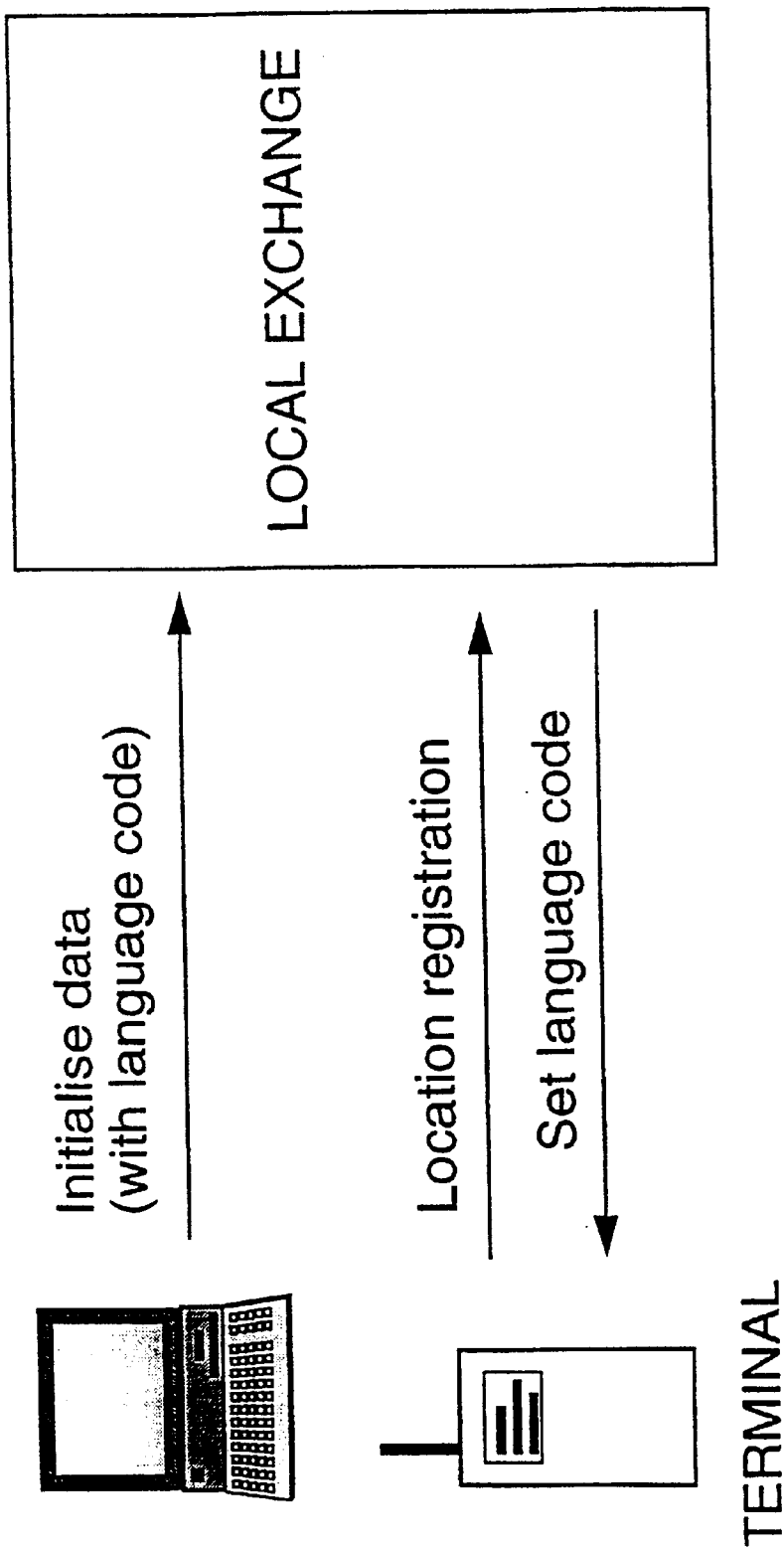
FIG. 3 is a schematic drawing illustrating a third embodiment of the present invention, wherein the language is set at initialisation of the terminal.

In FIG. 3 there is illustrated a third embodiment of the present invention, wherein a terminal comprising for example a mobile telephone, as well as a personal computer, communicate with a local exchange.

In this embodiment the language is set at initialisation of the terminal, i.e. the language of the user is set at initialisation of the users data. When the user connects the wired terminal, or perform a roaming procedure with the wireless terminal, the terminal is informed about the language to be used for displaying text.

ADVANTAGES

In a multi-lingual environment, it is desirable to be able to select the language in which one wants to communicate. In the present solutions for displaying information, one can select the language for display information for messages generated in the terminal and messages generated in the local exchange independently. The result may be that different information is displayed in different languages.

This solution makes it possible to select the same language for all information displayed.

BROADENING

The principles described here may be applicable for all modern telecommunication systems where both the local exchange and the end user terminal have the possibility to generate text information, which is displayed on a terminal. That includes both private and public exchanges, and wired as well as wireless terminals.

These principles may also be applicable to other systems that use text messages generated in different places to communicate with the user. This may be in programs working together internally on a computer, peripherals attached to a computer, etc.

What is claimed is:

1. A method for selecting a language to be used in communications in a telephone network between a local exchange of the telephone network and a mobile terminal used in the telephone network, the mobile terminal for sending and/or receiving audio and text data to and/or from the local exchange, the method comprising:

providing predefined codes stored in the mobile terminal associated with different languages in order to synchronize the language in the mobile terminal and the language of a local exchange of the telephone network, or vice versa;

for the user of the mobile terminal to select an appropriate language on the user terminal, the terminal user using a built-in option built into the mobile terminal for this selection so as to select a language, and the language code corresponding to the selected language being transmitted from the terminal to the local exchange so that the local exchange communicates with the terminal using the selected language; and when the mobile terminal begins a roaming procedure in a new roaming area, one of the language codes is automatically sent to a corresponding local exchange of the telephone network so that a language is set for communication between the mobile terminal and said corresponding local exchange so as to automatically set a common language for communication between the local exchange and the mobile terminal.

2. Method as claimed in claim 1, characterized in that the language code is transmitted from the terminal to the local exchange during a terminal roaming procedure.

3. Method as claimed in claim 1, characterized in that the language code is transmitted from the terminal to the local exchange at the establishment of a call.

4. Method as claimed in claim 3, characterized in that said call is a normal call, or a call set up to inform the local exchange of the desired language.

5. Method as claimed in claim 4, characterized in that the language of the user is set at initialisation of the users data.

6. Method as claimed in claim 5,
characterized in that when the user connects a wired terminal, or performs a roaming procedure with a wireless terminal, the terminal is informed of the language to be used for this displaying text.

7. Method as claimed in claim 1, characterized in that messages generated in the terminal and messages generated in the local exchange are selected independently.

8. Method as claimed in claim 1, characterized in that different information is selected to be presented in different languages.

9. Method as claimed in claim 1, characterized in that the same language is selected for all information being displayed.

10. The method of claim 1, wherein the language code corresponding to the selected language is transmitted from the terminal to the local exchange prior to establishment of any call between the terminal and the local exchange.

11. The method of claim 1, wherein the language code is not a DTMF code.

12. The method of claim 1, the language code is used to set up the selected language without a need for DTMF codings or voice prompts regarding language.

13. A method of selecting a language for use in a mobile terminal, the method comprising:

storing a plurality of language codes in the mobile terminal, the language codes corresponding to different languages;

setting a preferred language via one of the language codes, in the mobile terminal;

prior to establishing a call between the terminal and a local exchange, transmitting at least one of the language codes from the terminal to the local exchange so that a language is selected so that the local exchange communicates with the terminal using the selected language; and when the mobile terminal begins a roaming procedure in a new roaming area, the mobile terminal automatically sending one of the language codes to a corresponding local exchange of a telephone network so that a language is set for communication between the mobile terminal and said corresponding local exchange so as to automatically set a common language for communication between the local exchange and the mobile terminal.

14. The method of claim 13, wherein said transmitting of the at least one language code is carried out during a roaming process.

15. A mobile phone comprising:

means for storing predefined language codes in the phone associated with different languages;

means for enabling a user of the phone to select a language and corresponding language code;

means for transmitting the selected language code from the phone to a local exchange in order to synchronize the language in the phone and local exchange, or vice versa; and means for automatically sending one of the language codes to a corresponding local exchange of a telephone network when the mobile phone begins a roaming procedure in a new roaming area so that a language is set for communication between the mobile phone and said corresponding local exchange.

16. The mobile phone of claim 15, wherein said means for transmitting is capable of transmitting the selected language code to the local exchange prior to establishment of a call between the phone and local exchange.

* * * * *